Dec. 28, 1937.                J. J. SEIP                2,103,829
CLARIFYING LIQUIDS AND APPARATUS THEREFOR
Filed Nov. 20, 1936
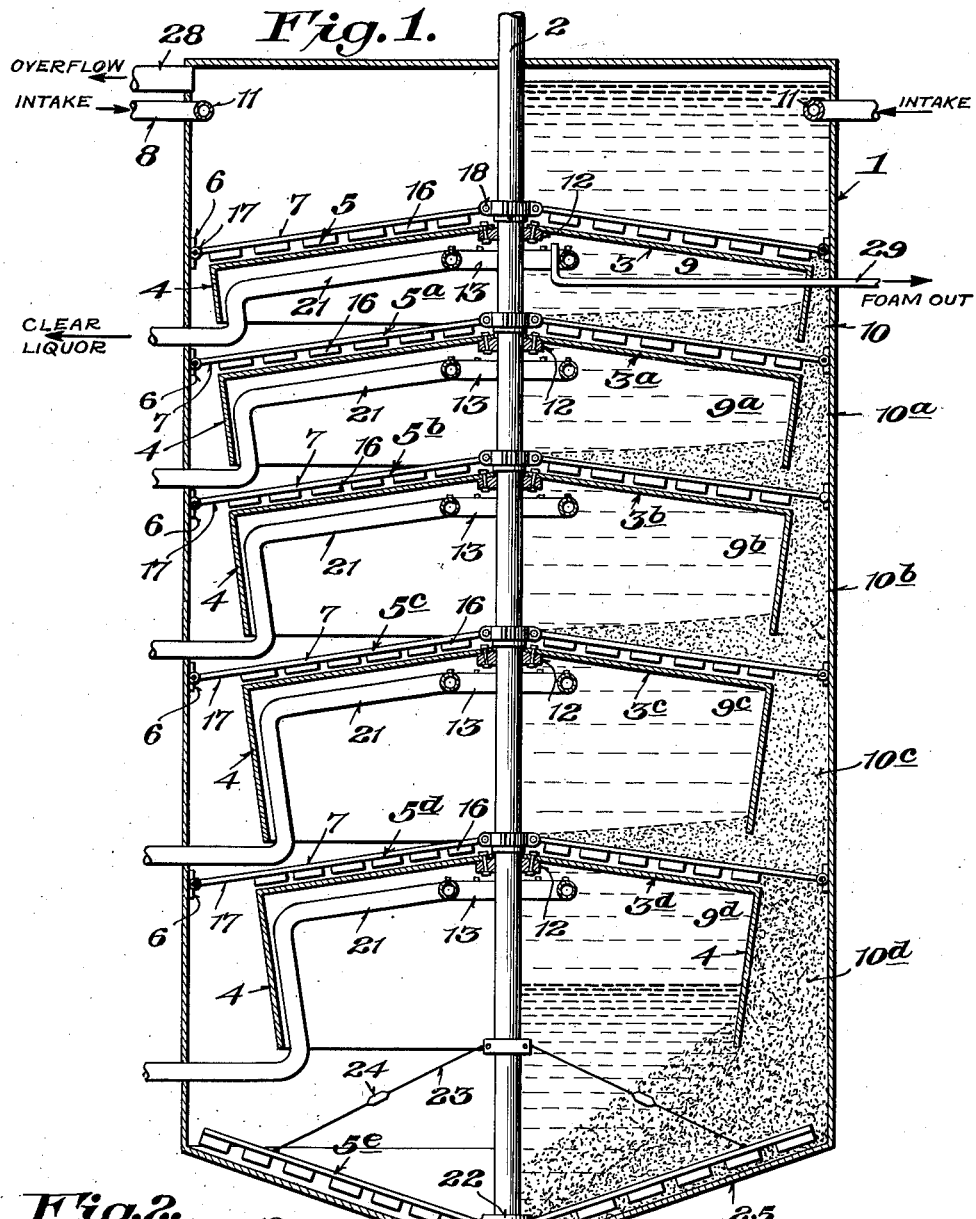
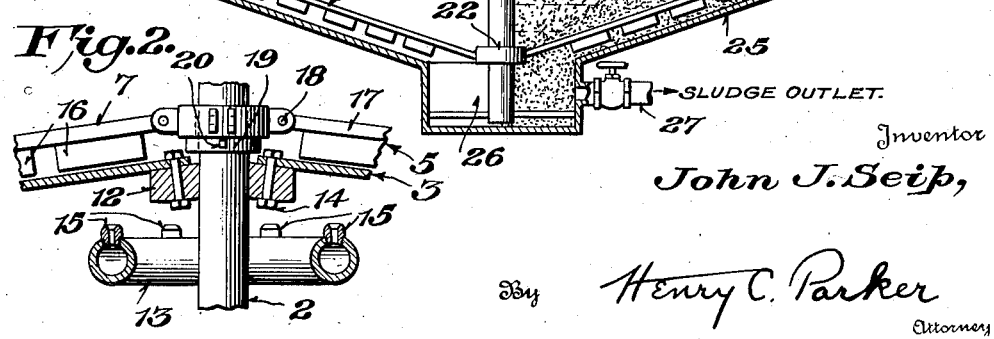
Inventor
John J. Seip,
By Henry C. Parker
Attorney Patented Dec. 28, 1937

2,103,829

UNITED STATES PATENT OFFICE 2,103,829

CLARIFYING LIQUIDS AND APPARATUS THEREFOR

John J. Seip, Allentown, Pa.

Application November 20, 1936, Serial No. 111,941

8 Claims. (Cl. 210—55)

This invention relates to clarifying liquids and apparatus therefor; and it includes an apparatus for clarifying liquids containing suspended solids, such as are encountered in the defecation of cane and beet sugar juices, for example, said apparatus comprising a tank, a plurality of superimposed spaced trays having depending flanges mounted in said tank, said trays defining an upper stilling zone, a discharge zone and a plurality of clarifying zones, means for introducing liquor to be clarified into said stilling zone, means for withdrawing clarified liquor from the upper parts of said clarifying zones, means for withdrawing sludge from the bottom of said tank, scrapers for propelling solids precipitated on said trays towards the openings formed between said depending flanges and said trays and means for maintaining said trays and said scrapers in relative motion at such a rate that a given point on a tray is traversed by a scraper not more frequently than about once in three minutes whereby, during operation of said clarifier, a bed of partially flocculated solids is built up on said trays covering said openings and acting as a filter for the liquor entering said clarifying zones. The process of my invention comprises establishing and maintaining a plurality of superimposed clarifying zones having quiescent sludge beds of substantial depth in the lower sections thereof; said clarifying zones being separated from each other by transverse precipitation surfaces which are advantageously belled or crowned; passing liquor to be clarified into said clarifying zones through said sludge beds, removing clarified liquor from the upper portions of said clarifying zones, moving precipitated solids along said precipitation surfaces and out of said clarifying zones by means of scrapers cooperating with said surfaces, and maintaining said precipitation surfaces and said scrapers in relative motion at such a rate that a given point on a surface passes a scraper not more frequently than once in about 3 to 6 minutes, thereby removing solids from said precipitation surfaces at a rate substantially equaling the rate of accumulation of said solids in said sludge beds and without destroying said sludge beds; all as more fully hereinafter set forth and as claimed.

In the prior art a large number of different designs have been proposed for the so-called multi-tray clarifiers. In the operation of these clarifiers one principal difficulty has been the fact that clarification has not been complete. The clear liquor discharge obtained by the usual operation methods has been far from clear, in comparison with the liquors discharged from filters, for example. In addition to this it has been found almost impossible to obtain liquors of equal clarity with an equal rate of discharge from the various trays.

In two copending applications, Serial Nos. 633,520 and 646,346, filed September 16, 1932 and December 8, 1932, respectively, I have described certain clarifiers in which the two latter disadvantages have been overcome. In these clarifiers I provide discharge zones of increasing cross sectional area downwardly and/or clarifying zones of increasing depth from zone to zone downwardly. In this manner trays of equal clarifying capacity are obtained and there is a considerable improvement in the uniformity of the clear liquor discharged from the different trays. While the constructions described and claimed in these acknowledged applications have thus made an important improvement in the clarifying art, the clarity of the liquor discharged from these clarifiers still leaves something to be desired when operated by customary methods.

In the construction described and claimed in Serial No. 646,346, centrally mounted trays are provided, which are closed at the top and which have peripheral depending flanges. These flanges, with the wall of the tank, form a peripheral discharge zone for solids. The openings between these flanges and the trays form the entrances to and exits from the clarifying zones, the liquor to be clarified passing in through these openings and the solids precipitated on the trays being discharged through the same. Clear liquor is drawn off at the upper central portions of the clarifying zones. It is thus evident that this clarifier operates on the counter-flow principle, the solids and liquids moving in opposite directions.

I have discovered that it is possible to so operate the clarifier described in Serial No. 646,346 that it is possible to obtain crystal clear effluents from all trays, effluents which compare favorably with those obtained from the best filters. This is accomplished by allowing a sludge bed of substantial depth to build up on each of the trays of the clarifier, these beds being of sufficient depth to stratify and to cover the peripheral openings between the depending flanges and the trays. When operated in this fashion the sludge beds act as filters to the liquor entering the clarifying zones through these openings and I have found that these sludge beds produce a degree of clarification which is equaled only by the best of filters. The present invention is thus, in some respects, an improvement over that described in Serial No. 646,346.

In order to build up sludge beds on the various trays it is necessary that the sweeps for removing precipitated solids be operated extremely slowly, the rate of operation being about one-third to one-sixth of that formerly used. In the prior art it has always been thought necessary to clear the clarifying zones from sludge as rapidly as possible. It has not been proposed to make any use of the sludge before its complete precipitation and removal. The present invention therefore proceeds contrary to the usual teachings of the art. And, by the new mode of operation employed, a new result is produced.

It appears somewhat strange that this new method of operation has not been discovered previously. But this is probably explained by the facts that my new method can be conducted with only a relative few of the many clarifiers that have been proposed in the art and that the counterflow principle which is employed in the clarifier of Serial No. 646,346 is novel when used in connection with bell-shaped trays and mechanical sweeps. And it was only during a series of experiments with this design of clarifier that this new method of operation was discovered.

I have also discovered that the clarifier of Serial No. 646,346 can be modified in order to adapt it somewhat more perfectly to my new process. These modifications can be explained more readily by reference to the accompanying drawing which shows more or less diagrammatically, a clarifier within the purview of the present invention, which is particularly useful in the conduct of my process. In this showing, Fig. 1 is a vertical cross section through the clarifier, while Fig. 2 is a partial enlarged view showing the mounting of the parts.

In the two figures like parts are represented by like reference numerals. The cylindrical tank of the clarifier is shown generally at 1, this tank being either open or closed at the top. A central vertical shaft 2 passes through the tank. The trays 3, 3a, 3b, 3c and 3d are mounted on a collar 12 by means of bolts 14 (see Fig. 2), the collar being welded or otherwise secured to the shaft 2. The shaft and trays supported thereby are rotated by means of a motor or other driving means operating through a reducing gear not shown. The trays are provided with depending flanges 4, forming clarifying zones 9, 9a, 9b, 9c and 9d. These depending flanges further form, with the wall of the tank the peripheral discharge zones 10, 10a, 10b, 10c and 10d.

The sweeps, indicated generally at 5, 5a, 5b, 5c and 5d are mounted on the sides of the tank by means of brackets 6 which may be made adjustable. The upper ends of the sweeps may be joined by means of a ring 7 if desired, the construction and mounting of this ring being shown best in Fig. 2. The sweeps are provided with a plurality of scrapers 16 which are secured to and depend from the arms 17. These arms are pivoted by means of knuckle joints 18 to the rings 7 which form a freely sliding fit with the shaft 2. The rings 7 are supported by means of collars 19 which provide a bearing surface for the rings and which are adjustably secured to the shaft 2 by means, such as set screws 20.

The bottom sweeps 5e are mounted on the shaft 2 by means of bracket ring 22 and are supported by ties 23 and turnbuckles 24. These sweeps bear on the sloping bottom 25 of the tank and serve to propel the sludge into the well 26 from which it is removed through the sludge outlet 27.

Liquor to be clarified is introduced into the top of the tank through the inlets 8 which may be provided with short T's 11 at their ends in order to introduce liquor into the tank in a substantially horizontal plane. The space between the upper tray and the surface of the liquor forms a stilling zone the area of which advantageously includes the entire upper section of the tank.

Clarified liquor is removed from the upper parts of the clarifying zones 9, 9a, etc. by means of the draw-off pipes 21, these pipes being passed beneath the flanges 4 of the trays and then through the wall of the tank. The draw-off pipes are provided with pipe rings 13 which surround the shaft 2 and the clarified liquor passes into these pipe rings through nipples 15. These nipples are threaded into the pipe rings 13 and this threaded section can be employed in leveling the nipples to provide equal discharge rates. The tank is provided with an overflow 28 for removal of scum and each tray may be provided with a small pipe 29 serving as a foam outlet.

The discharge zones 10, 10a, etc. as shown in the drawing, are of increasing cross sectional area downwardly, owing to the flanges 4 being sloped inwardly at their lower ends. This construction forms an important feature of the invention of Serial No. 646,346 but is not necessary for the process of the present invention. The trays 3, 3a, etc. are also shown to be stepped inwardly from tray to tray downwardly, another feature which is not essential. Furthermore the clarifying zones 9, 9a, etc. are shown to be of increasing depth from zone to zone downwardly. This is another advantageous feature of my prior invention which is not essential here.

When my clarifier is placed in operation, liquor to be clarified is introduced through the intake 8. The shaft 2 is rotated at a rate of one revolution in about 12 to 24 minutes. Air is vented from the clarifying zones by means of the pipes 29. Clarification begins immediately and clear liquor is drawn off through the pipes 21, the introduction of liquor and withdrawal being at such a rate that the liquid level in the tank remains close to the overflow 28.

The first liquor removed is not highly clarified but, within a short time the sludge accumulates on the trays and in the lower sections of the clarifying zones. This sludge forms beds of finely divided particles in suspension which soon stratify and cover the peripheral openings between the depending flanges 4 and the trays as shown in the drawing. The liquor entering the clarifying zones is therefore forced to pass through these sludge beds of suspended particles. Filtration of the incoming liquor results and, as soon as this occurs, the clarified liquor becomes crystal clear. The apparatus as a whole is then operating as a multiple tray filter which is believed to be a new result in the art.

The slow rotation of the shaft 2 is essential in maintaining the sludge bed filters on the various trays. If this shaft is rotated more rapidly the solids are removed from the trays so rapidly that they do not build up sufficiently to cover the entrances to the clarifying zones. Imperfect clarification results. It is necessary for these sludge beds to be substantially quiescent to produce filtration.

The design shown in the drawing is particularly advantageous for use in the present process for the reason that the sweeps are stationary and hence keep the sludge bed filters in a substantially quiescent state. In my previous design the sweeps rotate and the sludge beds are disturbed periodically by passage of these sweeps. In the new design the liquor offers but slight resistance to the slow rotation of the trays and hence the sludge beds are substantially undisturbed by this rotation. And any such disturbance is continuous rather than being periodic as in my previous design. It is therefore seen that my present design is particularly adapted for use when my sludge bed filters are employed on the various trays and when the device is operated as a filter. My clarifier can, of course, be operated in the usual manner if it is not necessary that a high degree of clarification be obtained.

While I have described what I consider to be the best embodiment of my invention, it is obvious, of course that many modifications can be made which are within the skill of the art and which fall within the scope of the following claims. For example, it is possible to so modify one of the usual types of clarifiers, which operate on the counter-flow principle and which employ a central down-take, that my process can be conducted. For satisfactory service this type of clarifier usually requires a larger down-take and larger than usual openings in the trays. It is also advantageous to modify this design to provide a discharge zone of increasing cross sectional area downwardly. These changes provide larger inlets to the clarifying zones, thus producing a lower rate of flow of liquid per square inch through these inlets. This slower rate of flow prevents disruption of the sludge bed filters. And, of course, it is necessary to greatly reduce the rate of operation of the sweeps which should be driven in such manner that a given point on a tray is passed over by a sweep not more frequently than about once in from 3 to 6 minutes. When the suspended solids are light in weight this rate of operation may be reduced still further.

It is obvious that clarifiers operating on the parallel-flow principle, that is, where the solids and liquids travel in substantially parallel paths, are incapable of being operated in accordance with my process for the reason that the sludge is carried away from the entrances to the clarifying zones by the flow of the liquid. It is also true that, in clarifiers in which no mechanically operated sweeps are employed, the discharge of solids is usually too erratic for the maintenance of sludge filters on the trays. In order to conduct my process it is necessary that all liquor to be clarified pass through the sludge bed filters. This requirement further restricts the present invention in general to those clarifiers in which a single depending flange is employed on each tray, or at least to those types in which sludge is discharged through all entrances to the clarifying zones. It is possible, of course, to discharge sludge through more than one entrance, building up sludge bed filters at each entrance. In carrying out the process of the present invention it is only necessary to operate a multi-tray clarifier in such fashion that sludge beds of suspended solids are formed on each tray below the clear liquor outlets, which beds cover the entrances to the clarifying zones, and that the liquor to be clarified is passed through these sludge beds at such a rate that these beds are not disturbed, the discharge of solids from said beds substantially equaling the rate of accumulation of solids therein.

It is largely immaterial whether the sweeps or the trays are rotated in the clarifier during use of the same as a filter, in accordance with my invention. However, as pointed out previously, there is somewhat less disturbance of the sludge bed filters when the trays are rotated instead of the sweeps. Various details of the structures of the clarifiers used in my process can be varied without materially affecting my process and without departing from the purview of the present invention. Other modifications within the scope of the following claims will be immediately evident to those skilled in this art.

What I claim is:

1. In the clarification of liquors containing solids in suspension, the process which comprises establishing and maintaining a plurality of superimposed clarifying zones communicating with a discharge zone for solids and separated by transverse precipitation surfaces, passing liquor to be clarified from said discharge zone into the lower sections of said clarifying zones, passing precipitated solids along said surfaces into said discharge zone in a direction counter to the flow of said liquor and at such a rate that beds of solids in suspension are produced in the lower sections of said clarifying zones in such a position that substantially all liquor entering said zones is forced to pass upwardly through said stratified beds of suspended solids and withdrawing clarified liquor from the upper sections of said clarifying zones.

2. The process of claim 1 wherein a stilling zone, communicating with said sludge discharge zone, is maintained above said clarifying zones, the liquor to be clarified entering said stilling zone prior to passing into said sludge discharge zone and into said clarifying zones.

3. The process of claim 1 wherein said clarifying zones are defined by spaced superimposed trays having depending peripheral flanges.

4. The process of claim 1 wherein the liquor to be clarified passes into said clarifying zones centrally and said sludge is discharged from said zones in a peripheral direction.

5. In the clarification of liquors containing solids in suspension, the process which comprises establishing and maintaining a plurality of central superimposed clarifying zones and a peripheral sludge discharge zone, said zones being defined by a plurality of superimposed trays having depending peripheral flanges, moving solids by means of scrapers peripherally across said trays into said discharge zone, said solids passing through the openings formed between said peripheral flanges and said trays, maintaining said scrapers and said trays in relative motion at a rate such that a given point on a tray is traversed by a scraper not more frequently than about once in 3 minutes, whereby beds of suspended solids build up on said trays covering said openings between said flanges and said trays, passing liquor to be clarified from said sludge discharge zone centrally through said openings and upwardly through said beds of suspended solids, and withdrawing clarified liquor from the upper sections of said clarifying zones, substantially all the liquor entering said clarifying zones being passed through said openings in counter-flow to the sludge which is discharged therethrough.

6. The process of claim 5 wherein the scrapers are maintained stationary and the trays are rotated.

7. In a multi-tray clarifier, a tank, means for introducing liquor to be clarified at the top of said tank, a plurality of superimposed, transverse spaced trays, substantially closed at their tops and having depending peripheral flanges, mounted in said tank, said trays defining an outer peripheral sludge discharge zone, a plurality of inner clarifying zones, and peripheral restricted passages below said depending flanges connecting said clarifying zones with said peripheral discharge zone, means for withdrawing clarified liquor from the upper central portions of said clarifying zones, stationary sweeps mounted above said rotating trays for gradually moving solids precipitated on said trays toward said discharge zone, means for withdrawing precipitated solids from the bottom of said tank, a source of power and speed reducing means connecting said source to said trays for slowly rotating said trays; said means for rotating said trays being adapted to produce such a rate of relative motion between said sweeps and said trays that a given point on a tray passes a sweep not more frequently than once in about 3 minutes, whereby, during operation of said clarifier, a bed of partially flocculated solids is built up at the lower sections of said clarifying zones covering said restricted passages formed between said depending flanges and said trays and acting as a filter for the incoming liquor to be clarified.

8. In a multi-tray clarifier, a tank, means for introducing liquor to be clarified in the top of said tank, a central vertical shaft passing through said tank, a plurality of superimposed spaced trays mounted on said shaft, being closed at the top and having depending peripheral flanges, said trays defining an upper stilling zone, an outer peripheral sludge discharge zone, a plurality of inner clarifying zones and peripheral restricted passages below said depending flanges connecting said clarifying zones with said peripheral discharge zone, means for withdrawing clarified liquor from the upper parts of said clarifying zones, means for withdrawing sludge from the bottom of said tank, stationary sweeps for propelling solids precipitated on said trays toward the said restricted passages formed between said flanges and said trays, a source of power and speed reducing means connecting said source to said shaft for slowly rotating said central shaft and said trays at such a rate that a given point on a tray is traversed by a sweep once in from about 3 to 6 minutes, whereby, during operation of said clarifier, a bed of partially flocculated solids is built up on said trays covering said restricted passages and acting as a filter for the incoming liquor entering said clarifying zones.

JOHN J. SEIP.